April 3, 1962 T. F. GROLL, JR., ETAL 3,027,755
APPARATUS AND METHOD FOR DETERMINING EFFECTIVENESS
OF DEFOAMERS IN FOAMY SYSTEMS
Filed Sept. 30, 1960
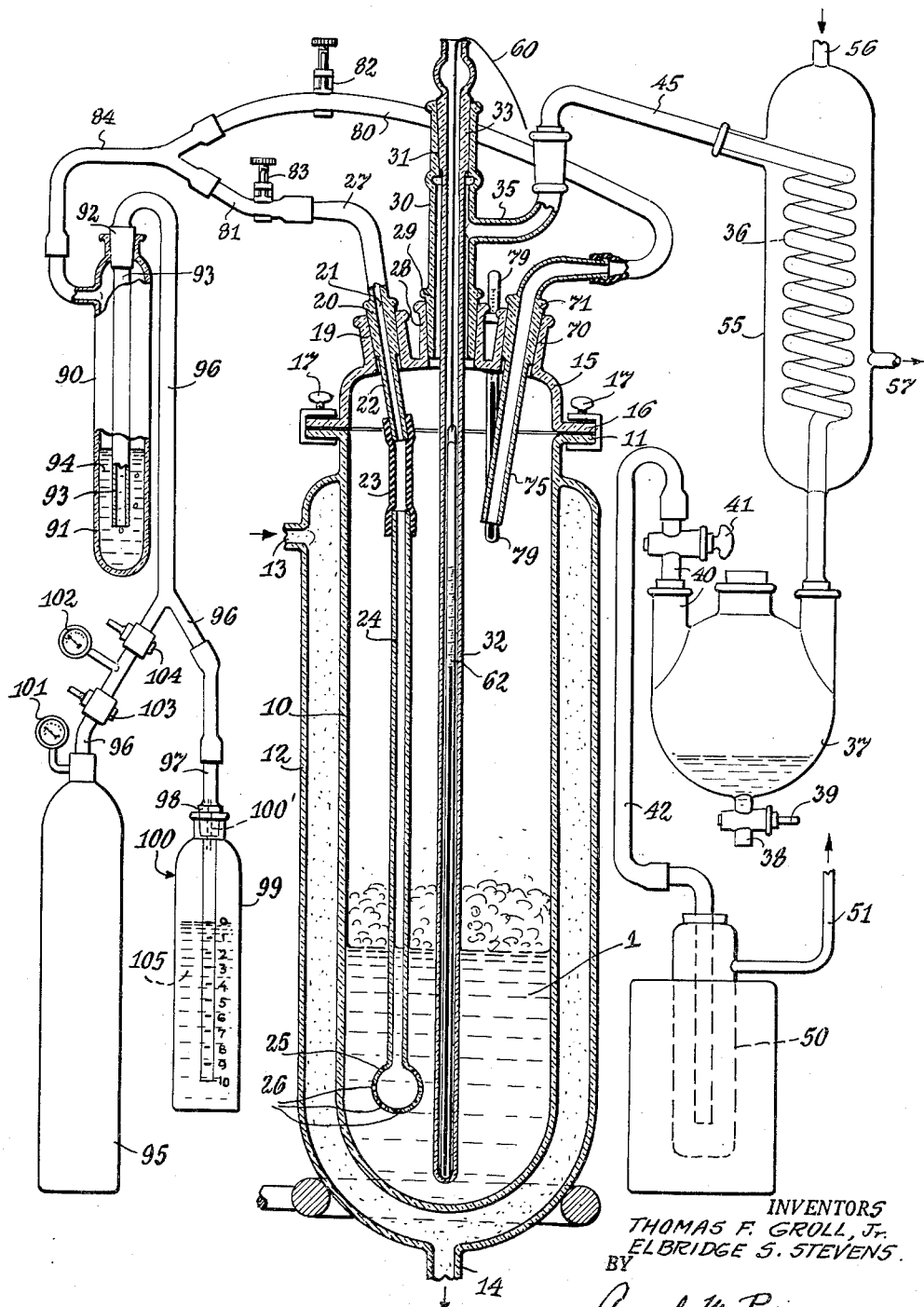
INVENTORS
THOMAS F. GROLL, Jr.
ELBRIDGE S. STEVENS
BY
Angelo M. Pisarra
ATTORNEY 3,027,755
Patented Apr. 3, 1962

3,027,755
APPARATUS AND METHOD FOR DETERMINING EFFECTIVENESS OF DEFOAMERS IN FOAMY SYSTEMS
Thomas Francis Groll, Jr., Elizabeth, and Elbridge S. Stevens, Murray Hill, N.J., assignors to Nopco Chemical Company, Harrison, N.J., a corporation of New Jersey
Filed Sept. 30, 1960, Ser. No. 59,546
10 Claims. (Cl. 73—53)

This invention relates to novel apparatus and methods for testing. The invention is more particularly directed to novel methods and apparatus for measuring the defoaming effectiveness of a defoamer in a foamy system and especially in a strippable foamy system. A foamy system as known to those skilled in the art is a fluid system which upon agitation results in the production of froth or foam. A strippable foamy system is such a system containing one or more components which are to be stripped or removed therefrom. Examples of such strippable foamy systems are certain synthetic rubber latices which are produced by copolymerizing unsaturated compounds such as butadiene-1,3 and styrene. After such latices are produced, it becomes necessary to strip off or remove unreacted components, catalysts, and/or only partially reacted materials, such as peroxides, styrene and/or monomeric copolymers or polymers. Such removal or stripping is generally effected by heating under atmospheric or subatmospheric pressure conditions. Many times in such stripping operations, a great amount of foam is produced and consequently defoamers have been combined therewith in efforts to reduce the foaming in such operation.

The main object of the invention is to provide a novel method and apparatus for determining the efficiency or effectiveness of various defoamers when used in foamy systems under consideration.

An illustrative embodiment of the apparatus of the invention is shown in the accompanying drawing which is a view in side elevation and partially in vertical cross section.

The apparatus consists of a transparent glass vessel 10 which, in the embodiment shown in the drawing is a 2 liter vessel in the form of an elongated cylinder whose internal height is approximately seven times its internal diameter. The vessel 10 has a closed bottom and open top and terminates at its upper end in an annular outwardly extending flange 11. A transparent glass steam jacket 12 has its upper end integrally connected to vessel 10 near the upper limit of vessel 10. The jacket 12 has a steam inlet opening 13 near the upper limit thereof, and an outlet 14 at the bottom thereof. A demountable transparent glass dome or top closure 15 having an outwardly extending annular flange 16 is mounted on the vessel 10. A thin film of petrolatum or other appropriate sealant material is disposed between the surfaces of the flanges 11 and 16 for sealing purposes after which the flanges may be clamped together and held in tight clamped relationship by screw compressor clamps 17 whose jaws are covered with gum rubber to prevent them from slipping. The dome 15 carries a plurality of necks with ground glass joints 19, 28 and 70. Mounted in the glass joint 19 is a glass stopper 20 forming a seal therewith. Integral with the glass stopper 20 which has an opening 21 centrally therethrough is a depending glass tubing 22 whose lower end is connected to one end of a short flexible demountable tube 23 of rubber, synthetic plastic or the like. The other end of the flexible tube 23 is connected to an elongated tube 24 which extends downwardly towards the bottom of vessel 10 and terminates in a hollow bulb 25 disposed near the bottom of said vessel and having small openings 26 through the wall thereof. Integral with the upper end of the stopper 20 is a bent glass inlet tubing 27. A glass tube 30, terminating in a hollow glass stopper 29 at its lower end and a ground glass joint 31 at its upper end, is mounted in the dome with the stopper 29 making a tight fit with the glass joint 28, in dome 15. An elongated glass thermometer-well 32 has its upper end terminating in a glass coin type stopper 33 having a central opening. The glass well may be inserted through the tube 30 and stopper 29 until its stopper 33 rests upon and makes a tight seal with the joint 31. In such a position as shown in the drawing, the well 32 is located along the approximate longitudinal center line of the vessel 10 and its lower limit is disposed near, for example 2–3″ from the bottom of said vessel 10, with that portion of well 32 between the joint 31 and the lower limit of the joint 28 being spaced from the interior cylindrical wall of tube 30.

The tube 30 has an opening in the side thereof communicating with the passageway in a glass tube 35, one end of which is integral with tube 30 and the outer end of which is attached to one end of a glass tube 45. The other end of tube 45 is connected to one end of a condenser coil 36. The other end of the condenser coil 36 is connected to a distillate collecting flask 37 having a discharge tube 38 in the bottom thereof. The discharge tube 38 has a petcock 39 therein for maintaining the distillate in said flask 37 or for permitting such distillate to be discharged therefrom. The flask 37 has an upper tube 40 with a petcock 41 therein. Connected to the upper end of the tube 40 is one end of a flexible metal or rubber tubing 42. The other end of the tubing 42 extends through a stopper of and into a cold trap 50 having a discharge outlet 51 extending to a hood (not shown). The condenser 36 has a water jacket 55 associated therewith and said jacket 55 has inlet and outlet openings 56 and 57 for the passage of cold water into, through and out of chamber 55.

A thermometer 62 is located in and supported by the well 32 and is so disposed therein that its bulb end is in contact with the bottom of said well.

The other end of thermometer 62 is attached to one end of a string 60 which extends through the upper part of the well and lays over and outside of stopper 31 and is used to raise and lower the thermometer when required.

A ground joint 70 in dome 15 has hollow stopper 71 disposed therein and makes a tight seal therewith. Integral with the stopper 71, having a central opening therein, is a glass purging tube 75 extending both above and below the stopper 71. The lower extremity of the tube 75 is preferably disposed above the mid length of the vessel 10 and near the upper limit of vessel 10. Rearwardly of the three neck joints 19, 28 and 70, is another neck joint (not shown) in which is disposed a sealing stopper (not shown) carrying a thermometer 79 whose lower end is disposed substantially above the mid length of said vessel 10 and near the upper limit of the vessel 10. The thermometer 79 serves to measure the temperature of the vapors at the upper end of the vessel 10 in the course of operation of the apparatus. Arms 80 and 81 respectively of a Y rubber tubing are respectively connected to the outer ends of the tubing 75 and tubing 27 and carry pinch clamps 82 and 83. The stem 84 of the Y tubing is connected to one side of a bubble counter 90.

The bubble counter 90 consists of a closed-bottom glass cylinder 91 having a stopper 92 through which extends a glass tubing 93 whose lower extremity is located appreciably below the upper surface of water 94 in cylinder 91. A cylinder 95 contains oxygen free highly purified inert gas, such as nitrogen, under pressure which is to act as the agitating medium in the operation of the novel apparatus. Instead of nitrogen, other inert gases such as argon, krypton, carbon dioxide, etc. may be used. A feed conduit line 96 extends from outlet of said cylinder 95 to the outer end of said tube 93. Coupled to said feed line 96 is a manostat 100, with line 96 connected to its glass tube 97 extending through one of the openings in stopper 98 closing the upper end of the glass cylinder 99. The glass cylinder 99 is calibrated downwardly vertically in inches starting with zero and ending with 10 as shown. Located in the cylinder is a liquid 105, preferably colored, and may be water colored with methyl orange indicator. The upper level of the liquid 105 at atmospheric pressure is such as to be at the "0" mark. Stopper 98 has a narrow vent 100' therethrough. In that portion of the line 96 between the connection of the tube 97 therewith and the cylinder 95 there are provided the pressure gauges 101, 102, and valves 103 and 104 for controlling the rate of flow of the nitrogen from the tank 95 through the bubble counter in its travel to and through the vessel 10.

Capacity calibrations of the vessel 10 were taken with the dome 15 and all of its associated parts in place. The vessel 10 was calibrated upwardly vertically in 50 cc. divisions from 500 to 1700 cc. thereby to provide visual means for ascertaining the levels of the mass in vessel 10 at different periods in the course of testing 500 cc. of a foamy system to be tested.

Various means may be employed for supporting the various components and sub-assemblies of the present apparatus by the use of supporting tables and stands.

The operation of the apparatus is as follows:

First 500 cc. of a system to be used such as a latex emulsion of butadiene-styrene, for example, are measured into a graduated cylinder. This material with which the defoamer is to be tested to ascertain the effectiveness of such defoamer therewith, is now poured into the elongated vessel 10 from which the dome 15 and the parts supported thereby previously had been removed therefrom. Then to said 500 cc. of said latex in vessel 10 there is added a suitable quantity of the defoamer to be tested. The amount of the defoamer added thereto may vary, depending upon the particular defoamer employed as well as the foamy system employed. However, in general, for most purposes from one to five grams of the defoamer is added to the 500 cc. of said latex in vessel 10. Then the dome 15 together with the parts carried thereby are placed in position as shown in the drawing and the flanges 11 and 16, whose opposing faces were previously greased, are clamped together by the clamps 17 to make a fluid tight seal. The petcock 41 is opened, petcock 39 is closed, water is permitted to flow through the cooling chamber 55, the valve 103 is partially opened, the pinch clamp 82 is removed, the pinch clamp 83 is in operative condition on line 81, the valve 104 is actuated whereupon some of the nitrogen gas from the cylinder 95 passes into the tube 97 to depress the liquid in the tube 97 of the manostat 100. The major part of the nitrogen passes through the remainder of tube 96, through the bubble counter 90, through stem 84, arm 80 and into and through the purging tube 75. The valve 104 is adjusted until the level of the liquid in the tube 97 has been depressed to the 1" mark as indicated by the calibration marks on cylinder 99.

While this condition is maintained, bubbling of the nitrogen through the liquid 94 at the rate of about 8 bubbles per second is observed. As said nitrogen follows the path before set forth it flows out of the lower end of the purging tube 75 in the zone above the level of the latex and defoamer mix and carries with it the air above the level of said mix and such gaseous mass passes upwardly in the space between the tube 30 and well 32, into and through the tube 35, tube 45, through coil 36, through the flask 37, tube 42 through the cold trap 50 and out of the exit tube 51 into the hood, thereby to purge the space above the level of said latex and defoamer mix (shown as 1 in the drawing) of air whose oxygen component if present might cause explosion in the testing operation. As soon as the purging action is commenced a moderate flow of steam is initiated and continued into jacket 12. The purging is continued until the air is completely removed from vessel 10 and the moderate flow of steam is continued from the time of its initiation to the end of the test herein described.

At the end of said purging period, all of the air was completely removed and nitrogen replaced therewith. When the temperature of the latex and defoamer mass has reached the desired value, which may be 100° or less, another series of steps is begun.

The pinch clamp 82 is placed on tube 80 to shut-off the flow of nitrogen through the tube 80 and the pinch clamp 83 is removed from tube 81 to permit the flow of nitrogen through tube 81. Valve 104 is quickly adjusted to increase the flow of nitrogen through tube 96. The flow of nitrogen is very quickly so-controlled that the level of the liquid in tube 97 of the manostat is lowered from the "1" to the "9" calibration. This rate of gas flow is maintained throughout the remainder of the test, during which the nitrogen passes into and through the openings 26 in bulb 25 and into and through the latex and defoamer mass. As soon as the aforesaid change is made whereby the manostat reading is "9," a stop watch is started and a reading of the top level of the entire mass and foam is observed at this time, known as the zero time.

In the course of heating said latex and defoamer mass to 100° C. or other desired temperature while the air is being purged from the vessel, the strippable components or materials in the latex and defoamer mass become gaseous, expand and tend to force themselves out of the mass. In consequence thereof there generally is a volume increase of about 25 to 75 cc. of the entire mass. Upon the passage of the nitrogen from bulb 25 into and through said mass, the mass is thoroughly agitated and volatile vapors escape with the inert nitrogen, forming a froth or foamy crest.

Due to the action of the defoamer, the nitrogen and evolved gases are released from said froth or foamy crest and then pass through the space between tube 30 and well 32, through tubes 35 and 45, condenser coil 36 where some of them may be condensed into liquid which flows into flask 37, and others, such as the nitrogen and uncondensable gases pass through the aforesaid elements into and out of the cold trap 50 and eventually out of tube 51 into the hood, although some of the gaseous material entering cold trap 50 may be condensed therein.

The nitrogen is continuously fed under the aforesaid conditions to the mass in vessel 10 and the height of the entire foamy mass is observed, using the calibrations on vessel 10, and recorded. Such observations are first made and recorded at zero time as before set forth and then after said zero time, at 5, 10, 15, 20, 30, 45, 60 and 90 seconds, 2, 3, 5, 10, 15 and 30 minutes and at 15 minute intervals thereafter over a period of the next one half to three hours or more depending upon the foamy systems and defoamers under test. The values ascertained are recorded and plotted, total volume vs. time and a curve is drawn. The resultant curve is maintained as a permanent record for comparative purposes and also provides information to those skilled in the art of the performance of the defoamer used in such a foamy system tested.

It has been observed that in such tests, the thermometer 62 shows a temperature drop of about ten degrees in said 5 minute period. It has been observed that under the aforesaid conditions, the upper level of such a foamy mass containing an efficient defoamer rises rapidly from an initial volume of 525 to 575 cc. at zero time to a maximum volume of less than 800 cc. at any time between said zero time and 5 minutes thereafter. Generally the upper level of said foamy mass increases rapidly to maximum in the period between zero time and 2 minutes thereafter and then decreases in the period between said 2 minute and 5 minute times.

The aforesaid indicates that the volatiles, such as unreacted material or monomeric reaction products etc., are converted to the gaseous state and exert great force in tending to liberate themselves from the remainder of said mass and that the action of the defoamer greatly reduces the tendency thereof from causing undesirable expansion of the mass.

In the course of said period from zero time to said 5 minute time, due to the action of the defoamer, the volatiles are liberated and then pass upwardly beyond the upper level of the foamy mass into and through the spaces between well 32 and tube 30, through tubes 35 and 45, into the cooled condenser 36 where some of the volatiles are condensed and flow into flask 37, whose petcock 39 is now closed and the remainder flows through flask 37, tube 42 into cold trap 50 wherein some may be condensed. The uncondensed gases pass through discharge tube 51 into a hood (not shown). The condensed volatiles in flask 37 and trap 50 are combined and weighed and this measurement is recorded on the permanent graph hereinbefore referred to.

Also, the temperature of the mass as shown on the thermometer 62, as well as the temperature of gas above the 1500 mark of vessel 10 as shown on thermometer 79 are observed and recorded at said zero time and each reading time as desired. In many instances the foamy mass in vessel 10 in the course of testing is such that the thermometer 62 may not be read when in the position shown in the drawings and in such cases the thermometer is raised by pulling string 60 to lift the thermometer to such level that it may be read and is then lowered to its original position after which it is raised as before for the next reading, etc.

A blank run was made and in this case the 500 cc. mass in the absence of any defoamer was tested in the manner heretofore set forth and within 5 seconds of the zero time, the level of the mass had increased from initial volume of 525 to 575 cc. to 1500 cc.

Of course, after the termination of any particular test, the nitrogen feed is first cut off at 103 and, the parts requiring cleansing are cleaned and then reassembled, and the apparatus is ready for use in another test.

Another embodiment of novel apparatus of this invention is the apparatus shown in the drawings and herebefore described except that vacuum is employed. In this embodiment the monostat 100 is cut-out of line 96 by the use of a suitable valve in tube 97 and a vacuum pump together with a vacuum gage (not shown) is connected to the discharge tube 51. When the vacuum pump is in operation, the degree of vacuum may be varied as desired so that subatmospheric pressures of between 10 and 30 mm. of mercury pressure are used.

Since certain changes may be made in carrying out the aforedescribed processes and modifications effected in the apparatus for practicing the principle thereof, without departing from the scope of the invention, it is intended that all matter contained in the above description or shown in the accompanying drawing, shall be interpreted as illustrative and not in a limiting sense.

We claim:

1. Apparatus of the class described comprising an elongated transparent vessel having an open upper end, a closure top therefor, an elongated well carried by said closure and extending into said vessel, the lower extremity of said well located in the lower end of said vessel, first means carried by said closure, having a passageway therethrough and extending into said vessel, the lower extremity of said means located in the lower end of said vessel, second means carried by said closure, having a passageway therethrough and extending into said vessel, the lower extremity of said second means located materially above the lower extremity of said first means, an elongated thermometer disposed in said well, the lower extremity of said thermometer located in the lower end of said well, a source of inert gas, third means for selectively conducting said gas through said second means and first means respectively thereby respectively to purge said vessel of air above material to be tested therein and to agitate said material and means for conducting gaseous material from said vessel in the course of said purging and agitation, said last mentioned means including means having a passageway in communication with the space below said closure.

2. Apparatus defined in claim 1, and a manostat operatively connected to said third means, said third means including a bubble counter for ascertaining the approximate rate of flow of said gas to said second means in the course of said purging.

3. Apparatus of the class described comprising an elongated transparent vessel having an open upper end, a closure top therefor, an elongated well carried by said closure and extending into said vessel, first means having a passageway therethrough, carried by said top and extending into said vessel, second means having a passageway therethrough, carried by said top and extending into said vessel, the lower extremity of said second means disposed in the lower portion of said vessel and a material distance below the corresponding extremity of said first means, the lower extremity of said well disposed in the lower end of said vessel, an elongated thermometer disposed in said well, the lower extremity of said thermometer disposed in the lower end of said well, a source of inert gas under pressure, means for selectively conducting said gas through said first means and second means respectively to said vessel thereby respectively to purge said vessel of air above material to be tested therein and to agitate said material, means for conducting gaseous material from said vessel in course of said purging and agitation, said means including means having a passageway in communication with the space below said closure, a wall of said last mentioned means comprising the outer surface of a portion of said well.

4. Apparatus of the class described comprising an elongated, transparent vessel having an open upper end, a removable top closure therefor, said closure having a plurality of openings therethrough, a removable well extending through one of said openings and carried by said closure, said well extending into said vessel, the lower extremity of said well disposed in the lower portion of said vessel, a tube carried by said closure, extending through another of said openings and into said vessel, another tube carried by said closure and extending through a third opening in said closure and into said vessel, means communicating with said first mentioned tube and having openings in a wall thereof for passage of gas therethrough, said means disposed in the lower portion of said vessel and a material distance below the extremity of said second mentioned tube, an elongated thermometer disposed in said well with the bulb end thereof located in the lower part of said well, a source of inert gas, means for selectively supplying to said vessel said gas through said first mentioned tube and said second mentioned tube together with said means thereby respectively to purge said vessel of air above material to be tested therein and to agitate said material, means for conducting gaseous material from said vessel in the course of said purging and agitation, said second mentioned means including means having a passageway in communication with the space between said material and said closure, a wall of said last mentioned means comprising the outer surface of a portion of said well.

5. Apparatus of the class described comprising an elongated transparent vessel having an open upper end, a removable top closure therefor, said closure having a plurality of openings therethrough, a removable well extending through one of said openings and carried by said closure, said well extending into said vessel, the lower extremity of said well disposed in the lower portion of said vessel, first means having a passageway therethrough, carried by said closure, extending through another of said openings and into said vessel, second means having an opening therethrough carried by said closure and extending through a third opening in said closure and into said vessel, third means communicating with said first means and having a plurality of openings in a wall thereof for the passage of gas therethrough, said third means disposed in the lower portion of said vessel and a material distance below the lower extremity of said second means, an elongated thermometer disposed in said well with the bulb end thereof located in the lower part of said well, a source of inert gas, means for selectively conducting to said vessel said gas respectively through said second means and said first means together with said third means thereby respectively to purge said vessel of air above material to be tested therein and to agitate said material, and means for conducting gaseous material out of said vessel in the course of said purging and agitation, said last mentioned means including means having a passageway in communication with the space between said material and said closure.

6. Apparatus of the class described comprising an elongated transparent vessel having an open upper end, a removable closure therefor, said closure having a plurality of openings therethrough, a removable transparent well extending through one of said openings and carried by said closure, said well extending into said vessel, the lower extremity of said well disposed in the lower portion of said vessel, first means having a passageway therethrough, carried by said closure, extending through another of said openings and into said vessel, second means having a passageway therethrough, carried by said closure and extending through a third opening in said closure and into said vessel, third means communicating with said first means, located at the lower end thereof and having a plurality of openings in the wall thereof for the passage of gas therethrough, said third means disposed in the lower portion of said vessel and a material distance below the extremity of said second means, an elongated thermometer disposed in said well with bulb end thereof located in the lower end of said well, a source of inert gas, fourth means for selectively conducting to said vessel said gas through said second means and said first means together with said third means thereby respectively to purge said vessel of air above material to be tested therein and to agitate said material, a transparent jacket for receiving temperature controlling fluid, said jacket carried by said vessel, and fifth means for conducting gaseous material out of said vessel in the course of said purging and agitation, said fifth means including means having a passageway in communication with the space between said material and said closure, said passageway defined in part by the outer surface of a portion of said well.

7. Apparatus defined in claim 6, and a manostat operatively connected to said fourth means, said fourth means including a bubble counter for roughly ascertaining the rate of flow of said gas in the course of its travel to said second means.

8. Apparatus of the class described comprising an elongated transparent vessel having an open upper end, a closure top therefor, an elongated well carried by said closure and extending into said vessel, first means carried by said closure, having a passageway therethrough and extending into said vessel, second means carried by said closure, having a passageway therethrough and extending into said vessel, the lower extremity of said second means disposed in the lower portion of said vessel and a material distance below the corresponding extremity of said first means, the lower extremity of said well disposed in the lower end of said vessel, an elongated thermometer disposed in said well, the lower extremity of said thermometer disposed in the lower end of said well, a source of inert gas under pressure, third means for selectively conducting said gas through said respective second means and first means to said vessel thereby respectively to purge said vessel of air above material to be tested therein and to agitate said material, means for conducting gaseous material from said vessel in course of said purging and agitation, said means including means having a passageway in communication with the space below said closure, said third means including a bubble counter for ascertaining the approximate rate of flow of said gas to said first means.

9. Apparatus of the class described comprising an elongated transparent vessel having an open upper end, a closure top therefor, an elongated well carried by said closure and extending into said vessel, a tube carried by said closure and extending into said vessel, another tube carried by said top and extending into said vessel, the lower extremity of said second mentioned tube disposed in the lower portion of said vessel and a material distance below the corresponding extremity of said first mentioned tube, the lower extremity of said well disposed in the lower end of said vessel, an elongated thermometer disposed in said well, the lower extremity of said thermometer disposed in the lower end of said well, a source of inert gas, means for selectively conducting said gas through said respective tubes to said vessel thereby respectively to purge said vessel of air above material to be tested therein and to agitate said material, means for conducting gaseous material from said vessel in course of said purging and agitation, said last mentioned means including a condenser and means having a passageway in communication with said condenser and with the space below said closure, said passageway defined in part by a portion of the outer surface of said well, said first mentioned means including a bubble counter for determining the approximate rate of flow of said gas to said first tube in the course of said purging.

10. The method for determining the effectiveness of a defoamer in a foamy system comprising charging a predetermined quantity of said system and a predetermined quantity of defoamer into a graduated, transparent, elongated glass vessel having an open upper end, passing inert gas into the space above the level of said system and defoamer to purge the air therefrom and to substitute a volume of inert gas therefor, heating said system and defoamer in said vessel to increase the temperature thereof, while at elevated temperature passing said inert gas into said system and defoamer, and measuring the level of said system and defoamer at intervals.

References Cited in the file of this patent

UNITED STATES PATENTS

| | | |
|---|---|---|
| 1,866,296 | Christmann | July 5, 1932 |
| 2,315,983 | Ross et al. | Apr. 6, 1943 |